Dec. 29, 1936.   I. M. VAUGHN   2,066,084
NECK PROTECTOR
Filed Dec. 21, 1935
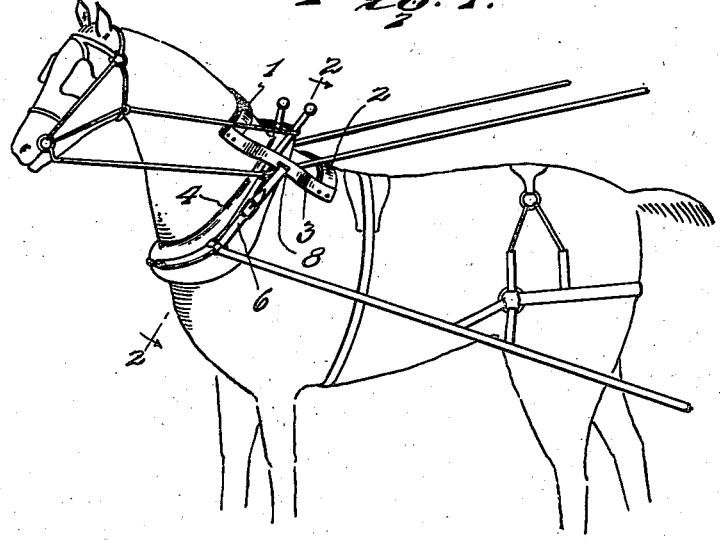
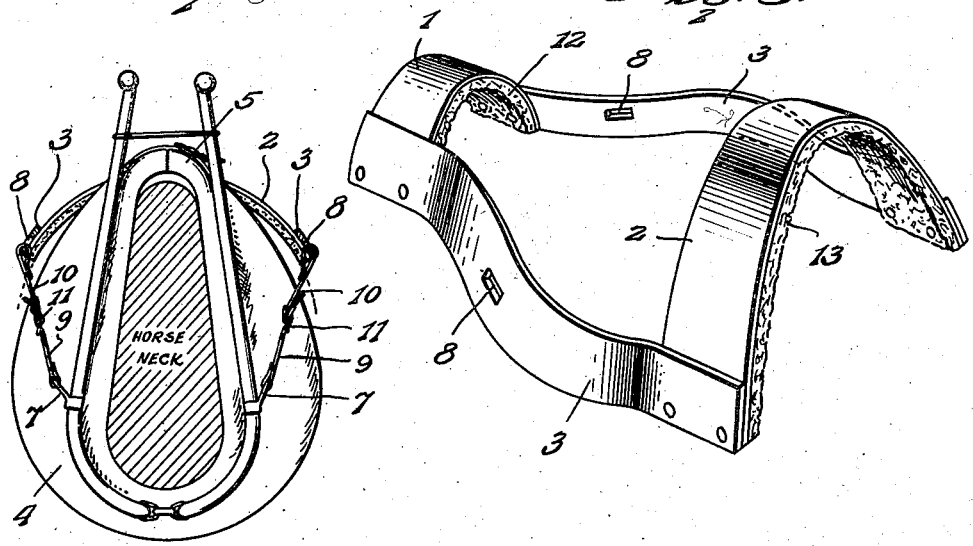
Inventor
I. M. Vaughn.

Patented Dec. 29, 1936

2,066,084

UNITED STATES PATENT OFFICE 2,066,084

NECK PROTECTOR

Irvin M. Vaughn, Elk City, Kans.

Application December 21, 1935, Serial No. 55,654

1 Claim. (Cl. 54—18)

This invention relates to a neck protector and more particularly to a device adapted to be set in place and connected with a collar in order to prevent the upper portion of the collar from rubbing against the back of a horse's neck and causing a sore which is very painful to the animal due to continued rubbing by an unsupported collar.

Another object of the invention is to so construct the protector, which may be referred to as a collar supporting device, that it may be very easily applied and when in place so connected with the collar that the collar may be drawn upwardly a sufficient distance to hold the upper end of the collar out of engagement with the back of the horse's neck without the lower portion of the collar fitting too closely against the front of the neck.

Another object of the invention is to so construct the device that it may be applied to horses of various sizes and support either a large or small collar.

The invention is illustrated in the accompanying drawing, wherein

Figure 1 is a perspective view showing the device in use.

Figure 2 is a view taken along the line 2—2 of Figure 1 looking in the direction of the arrows.

Figure 3 is a perspective view of the improved neck protector.

This improved neck protector or collar support as it may be termed is constructed as shown in Figure 3 and has front and rear yokes 1 and 2 connected by side strips 3. These yokes and the side strips are formed of metal of sufficient thickness and stiffness to cause the yokes and side strips to maintain the contours imparted to them by bending and attention is called to the fact that the two yokes are substantially U-shaped so that they will fit properly across the horse's neck and the adjacent portion of its back, while the side strips which have their front and rear end portions riveted or otherwise firmly secured in overlying engagement with arms of the yokes have their intermediate portions bowed outwardly. By so bending the intermediate portions of the side strips, they may extend across side portions of the collar 4 in outward spaced relation thereto and thus permit the collar to be drawn upwardly to the position shown in Figures 1 and 2 in which the upper portion 5 of the collar will be held out of engagement with the back of the horse's neck. Therefore, the upper portion of the collar will not rub against the back of the horse's neck and cause a sore which is very painful. The collar must be supported in the elevated position and in order to do so, straps 6 are employed having their lower ends engaged through eyes 7 of the collar and their upper ends secured through slots 8 formed in the side strips 3. The straps may each consist of companion sections 9 and 10 carried by the collar and side strips of the protector and connected with each other by buckles 11 or each strap may consist of a single strip of leather or other suitable material threaded through the eyes 7 and slots 8 with its ends adjustably connected by a buckle. In either case the straps may be adjusted to draw the collar upwardly a sufficient distance to dispose the upper end of the collar in spaced relation to the back of the horse's neck and support the collar in the adjusted position. Pads 12 and 13 formed of felt, sheepskin, or any other suitable material, are applied to underfaces of the yokes 1 and 2 to rest upon the horse's neck and prevent irritation. A protector so constructed may be very easily applied and, if necessary, the yokes and side strips may be bent to cause them to fit properly.

Having thus described the invention, what is claimed as new is:

A protector for a horse's neck comprising front and rear yokes of inverted U-shape adapted to straddle the back of a horse's neck, the front yoke having short arms, the rear yoke having arms of greater length than the arms of the front yoke and having lower ends of its arms spaced from each other a greater distance than the distance between lower ends of the arms of the front yoke whereby their end portions may be disposed out of contact with a horse's back, side strips extending between the front and rear yokes and having flat end portions rigidly secured against arms of the yokes in overlying relation thereto and their intermediate portions bowed outwardly between the yokes for extending across side portions of a horse's collar in spaced relation thereto, and means carried by the outwardly bowed intermediate portions of the side strips for suspending a horse collar in an elevated position with the upper portion of the collar out of contact with the back of a horse's neck.

IRVIN M. VAUGHN.